US012247415B2

(12) United States Patent
Pfunder et al.

(10) Patent No.: US 12,247,415 B2
(45) **Date of Patent: *Mar. 11, 2025**

(54) ELECTRONIC KEY READER FOR MECHANICAL KEYS

(71) Applicant: Schlage Lock Company LLC, Carmel, IN (US)

(72) Inventors: Dan Pfunder, Noblesville, IN (US); Brian C. Eickhoff, Danville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,960

(22) Filed: Aug. 1, 2023

(65) Prior Publication Data

US 2024/0175293 A1 May 30, 2024

Related U.S. Application Data

(63) Continuation of application No. 17/544,463, filed on Dec. 7, 2021, now Pat. No. 11,713,592, which is a continuation of application No. 16/271,315, filed on Feb. 8, 2019, now Pat. No. 11,193,306.

(51) Int. Cl.
*E05B 35/00* (2006.01)
*E05B 19/00* (2006.01)
*E05B 49/00* (2006.01)

(52) U.S. Cl.
CPC ........ *E05B 35/001* (2013.01); *E05B 19/0011* (2013.01); *E05B 19/0052* (2013.01); *E05B 49/002* (2013.01)

(58) Field of Classification Search
CPC ............. Y10T 70/7068; Y10T 70/7073; Y10T 70/7079; Y10T 70/7846; E05B 35/001; E05B 19/0011; E05B 19/0052; E05B 49/002
USPC ........ 70/344, 278.1, 278.3; 340/5.1, 5.2, 5.6
See application file for complete search history.

(56) References Cited

U.S. PATENT DOCUMENTS

| | | | |
|---|---|---|---|
| 5,132,661 | A | 7/1992 | Pinnow |
| 6,318,137 | B1 | 11/2001 | Chaum |
| 8,314,681 | B2 | 11/2012 | Bell |
| 10,030,416 | B1 | 7/2018 | Albertson et al. |
| 11,193,306 | B2 | 12/2021 | Pfunder et al. |
| 11,454,047 | B2 | 9/2022 | Valecha et al. |

(Continued)

*Primary Examiner* — Suzanne L Barrett
(74) *Attorney, Agent, or Firm* — Taft Stettinius & Hollister LLP

(57) ABSTRACT

An exemplary system includes a mechanical key and an access control device. The access control device includes a housing defining a keyway that has a fixed position within the housing. The access control device further includes a root depth sensor assembly, an insertion depth sensor assembly, a control assembly in communication with the sensor assemblies, and an electronic lock device. The control assembly is configured to determine the bitting code of the mechanical key based upon information received from the sensor assemblies, to compare the bitting code of the mechanical key to a lock/unlock bitting code; and to transmit a lock/unlock command in response to the bitting code matching the lock/unlock bitting code. The electronic lock device is configured to transition between a locked state and an unlocked state in response to receiving the lock/unlock command and without requiring rotation of the mechanical key.

24 Claims, 6 Drawing Sheets

(56) References Cited

U.S. PATENT DOCUMENTS

| | | | | |
|---|---|---|---|---|
| 11,713,592 | B2 * | 8/2023 | Pfunder | E05B 49/002 70/344 |
| 2002/0099945 | A1 | 7/2002 | McLintock et al. | |
| 2003/0205070 | A1 | 11/2003 | Chaum | |
| 2007/0241859 | A1 | 10/2007 | Bhat et al. | |
| 2017/0152677 | A1 | 6/2017 | Klammer et al. | |

* cited by examiner

144A

| Size Code | Output |
|---|---|
| 0 | 8.6 |
| 1 | 8.1 |
| 2 | 7.6 |
| 3 | 7.2 |
| 4 | 6.6 |
| 5 | 6.1 |
| 6 | 5.6 |
| 7 | 5.1 |
| 8 | 4.6 |
| 9 | 4.1 |

144B

| Insertion Depth | Output |
|---|---|
| Full Insertion | 0.6 |
| 1 | 0.5 |
| 2 | 0.45 |
| 3 | 0.4 |
| 4 | 0.35 |
| 5 | 0.3 |
| 6 | 0.25 |
| No Key | 0.2 |

| | Insertion Depth Sensor Output (339) | Root Depth Sensor Output (329) | |
|---|---|---|---|
| | 0.2001 | 1.503 | |
| | 0.2001 | 1.503 | |
| | 0.2001 | 1.503 | |
| | 0.2011 | 3.298 | |
| | 0.2162 | 4.987 | |
| | 0.2252 | 5.983 | |
| | 0.2301 | 7.956 | |
| | 0.2421 | 7.556 | |
| Bitting 6 | 0.2511 | 7.528 | Size 2 |
| | 0.2579 | 7.551 | |
| | 0.2699 | 7.897 | |
| | 0.2794 | 7.778 | |
| | 0.2801 | 7.354 | |
| | 0.2851 | 7.024 | |
| | 0.2921 | 6.678 | |
| | 0.3021 | 6.589 | |
| Bitting 5 | 0.3102 | 6.621 | Size 4 |
| | 0.3103 | 6.632 | |
| | 0.3189 | 6.856 | |
| | 0.3297 | 5.987 | |
| | 0.3356 | 5.287 | |
| | 0.3478 | 4.786 | |
| | 0.3501 | 4.598 | |
| Bitting 4 | 0.3559 | 4.508 | Size 8 |
| | 0.3634 | 4.611 | |
| | 0.3698 | 5.345 | |
| | 0.3725 | 6.085 | |
| | 0.3753 | 6.789 | |
| | 0.3811 | 7.343 | |
| | 0.3904 | 7.211 | |
| Bitting 3 | 0.4032 | 7.189 | Size 3 |
| | 0.4098 | 7.198 | |
| | 0.4191 | 7.343 | |
| | 0.4392 | 7.087 | |
| | 0.4453 | 6.543 | |
| | 0.4498 | 6.102 | |
| Bitting 2 | 0.4528 | 6.025 | Size 5 |
| | 0.4598 | 6.206 | |
| | 0.4659 | 6.645 | |
| | 0.4725 | 7.098 | |
| | 0.4801 | 7.233 | |
| | 0.4913 | 7.429 | |
| | 0.4956 | 7.698 | |
| | 0.5025 | 7.562 | |
| Bitting 1 | 0.5057 | 7.531 | Size 2 |
| | 0.5167 | 7.542 | |
| | 0.5298 | 8.125 | |
| | 0.5468 | 8.986 | |
| | 0.5601 | 9.416 | |
| | 0.5798 | 9.439 | |
| | 0.5902 | 9.449 | |
| | 0.5918 | 9.452 | |
| | 0.6111 | 9.449 | |

FIG. 6

ELECTRONIC KEY READER FOR MECHANICAL KEYS

The present application is a continuation of U.S. patent application Ser. No. 17/544,463 filed Dec. 7, 2021 and issued as U.S. Pat. No. 11,713,592, which is a continuation of U.S. patent application Ser. No. 16/271,315 filed Feb. 8, 2019 and issued as U.S. Pat. No. 11,193,306, the contents of each application hereby incorporated by reference in their entirety.

TECHNICAL FIELD

The present disclosure generally relates to electronic key readers for mechanical keys, and more particularly but not exclusively relates to such key readers including inductive sensing mechanisms.

BACKGROUND

Traditional lock cylinders typically include a shell, a plug rotatably mounted in the shell, and a tumbler system operable to selectively prevent rotation of the plug relative to the shell. While certain existing lock cylinders include sensors that enable the lock cylinder to electronically read the key cut, such lock cylinders typically maintain the plug-in-shell configuration of traditional lock cylinders. More particularly, such electronic lock cylinders typically read the code of the key electronically, then permit the key to rotate the plug when the key code matches an authorized code. However, the fact that the plug must remain rotatable relative to the shell can increase the cost and complexity of such lock cylinders. For these reasons among others, there remains a need for further improvements in this technological field.

SUMMARY

An exemplary system includes a mechanical key and an access control device. The access control device includes a housing defining a keyway that has a fixed position within the housing. The access control device further includes a root depth sensor assembly, an insertion depth sensor assembly, a control assembly in communication with the sensor assemblies, and an electronic lock device. The control assembly is configured to determine the bitting code of the mechanical key based upon information received from the sensor assemblies, to compare the bitting code of the mechanical key to a lock/unlock bitting code; and to transmit a lock/unlock command in response to the bitting code matching the lock/unlock bitting code. The electronic lock device is configured to transition between a locked state and an unlocked state in response to receiving the lock/unlock command and without requiring rotation of the mechanical key. Further embodiments, forms, features, and aspects of the present application shall become apparent from the description and figures provided herewith.

BRIEF DESCRIPTION OF THE FIGURES

FIG. 6 is an example of data that may be generated during the process illustrated in FIG. 5.

DETAILED DESCRIPTION OF ILLUSTRATIVE EMBODIMENTS

Figure 1:
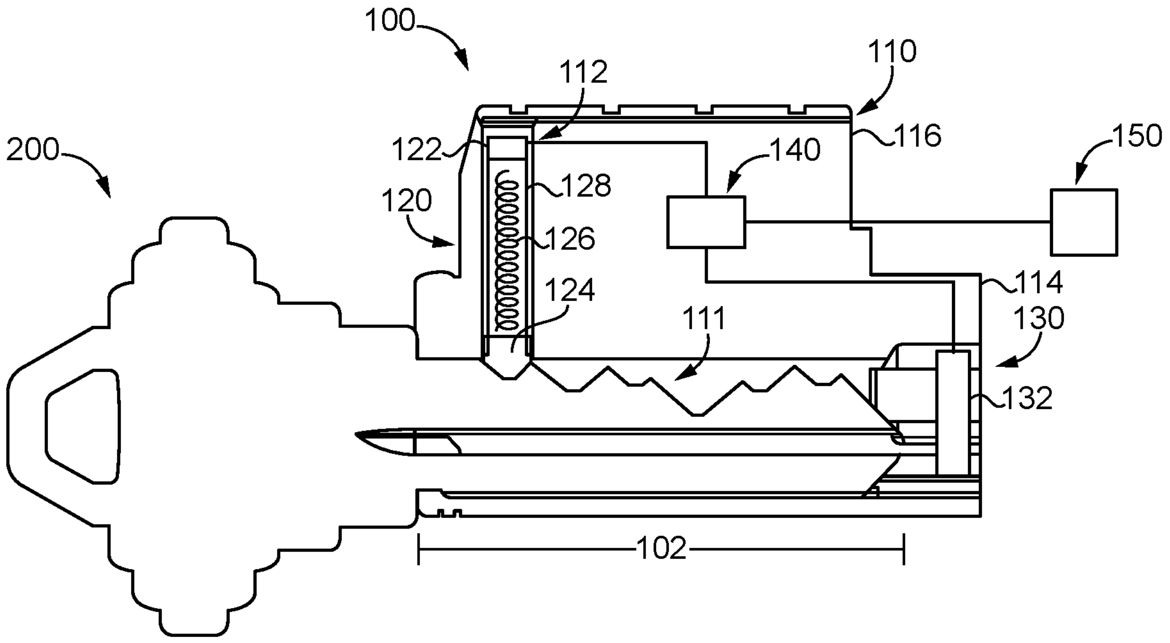
FIG. 1 is a cross-sectional illustration of an access control device according to certain embodiments, along with a key.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to “one embodiment,” “an embodiment,” “an illustrative embodiment,” etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a “preferred” component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of “at least one of A, B, and C” can mean (A); (B); (C); (A and B); (B and C); (A and C); or (A, B, and C). Similarly, items listed in the form of “at least one of A, B, or C” can mean (A); (B); (C); (A and B); (B and C); (A and C); or (A, B, and C). Further, with respect to the claims, the use of words and phrases such as “a,” “an,” “at least one,” and/or “at least one portion” should not be interpreted so as to be limiting to only one such element unless specifically stated to the contrary, and the use of phrases such as “at least a portion” and/or “a portion” should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in certain specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

With reference to FIG. 1, illustrated therein is an access control device 100 according to certain embodiments. The access control device 100 is configured for use with a key 200, and generally includes a housing 110, a first sensor assembly 120 configured to interface with an edge cut 216 of the key 200, a second sensor assembly 130 configured to sense an insertion depth of the key 200, and a control assembly 140 in communication with the first sensor assembly 120 and the second sensor assembly 130, and may further include an electronic lock 150. As described herein, control assembly 140 is configured to determine a bitting code of the key 200 based upon information received from the sensor assemblies 120, 130, to compare the determined code to at least one authorized code, and to issue commands based upon the comparing, for example to the electronic lock 150.

The housing 110 defines a keyway 111 configured to receive insertion of the key 200, and a shaft 112 that is formed in a proximal end portion of the housing 110 and which is in communication with the keyway 111. The housing 110 includes a body portion 114 and a tower 116 affixed to and extending from the body portion 114. The keyway 111 is defined in the body portion 114, and the shaft 112 is defined at least in part in the tower 116 and is connected with the keyway 111. Due to the fixed construction of the housing 110, the keyway 111 is not capable of rotating within the housing 110. During insertion of the key 200 into the keyway 111, an insertion depth 102 increases from a minimum when the key 200 is not inserted to a maximum when the key 200 is fully inserted.

The first sensor assembly 120 is seated in the shaft 112 and extends into the keyway 111. The first sensor assembly 120 includes a first sensor 122 seated in the shaft 112, a follower pin 124 configured to ride along the edge cut 216 during insertion of the key 200, and a spring 126 urging the follower pin 122 into the keyway 111. The first sensor assembly 120 may further include an insulating sleeve 128 surrounding the spring 124 and the follower pin 124. As described herein, the first sensor assembly 120 is configured to sense a root depth of the key 200 during insertion of the key 200, and may alternatively be referred to as the root depth sensor assembly 120. While other forms are contemplated, in the illustrated embodiment, the first sensor 122 is an inductive sensor, and is configured to generate information related to the root depth 218 of the key 200 based upon an inductance sensed by the inductive sensor 122.

The second sensor assembly 130 includes a second sensor 132 mounted in a distal end of the keyway 111. As described herein, the second sensor assembly 130 is configured to sense an insertion depth 102 of the key 200 during insertion of the key 200 into the keyway 111, and may alternatively be referred to as the insertion depth sensor assembly 130. While other forms are contemplated, in the illustrated embodiment, the second sensor 132 is an inductive sensor, and is configured to generate information related to the insertion depth 102 based upon an inductance sensed by the inductive sensor 132.

Figure 2:
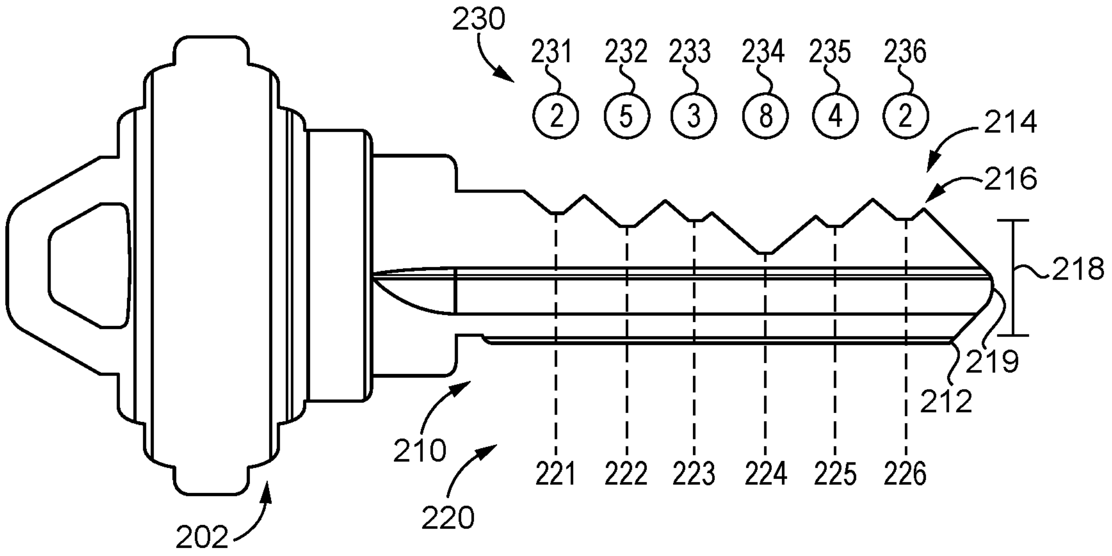
FIG. 2 is a plan view of the key illustrated in FIG. 1.

With additional reference to FIG. 2, the key 200 includes a head 202 and a shank 210 that extends distally from the head 202 and terminates in a tip 219. The shank 210 has a flat edge 212 and an opposite edge 214 that defines an edge cut 216 including a plurality of teeth 217 and a plurality of bittings 220 formed between the teeth 217. In the illustrated form, the edge cut 216 defines six bittings 220, including first through sixth bittings 221-226. The shank 210 also has a root depth 218, which is measured from the flat edge 212 to the cut edge 214. As will be appreciated, the value of the root depth 218 varies along the length of the shank 210 due to the variations imposed by the edge cut 216.

Each of the bittings 220 is formed at a known position along the length of the shank 210, and has a corresponding and respective root depth 218. The root depth 218 at each bitting 220 is selected from a predetermined set of root depths, each having a character such as a digit assigned thereto. In the illustrated form, the root depth 218 at each bitting is selected from a set of ten root depths, and are assigned sizing digits ranging from zero to nine. More particularly, the zero size is assigned to the largest of the possible root depths (i.e., the smallest-sized cut), and the nine size is assigned to the smallest of the possible root depths (i.e., the largest-sized cut). As will be appreciated, this convention is used for ease and convenience of description, and is not intended to be limiting.

With the above-described convention in mind, it is apparent that the edge cut 216 can be represented as a bitting code 230 including six size codes or digits 231-236 corresponding to the six bittings 221-226. In the illustrated example, the root depth 218 at the first bitting 211 corresponds to the two size, and the first digit 231 of the code 230 is therefore "2". Taking the size codes or digits corresponding to the root depth 218 at the remaining bitting positions 222-226, it can be seen that the code 230 for the illustrated key 200 is "253842."

During insertion of the key 200 into the keyway 111, the spring 126 urges the follower pin 124 into contact with the cut edge 214 of the key 200 such that the pin 124 travels along the edge cut 216, thereby causing the distance between the pin 124 and the inductive sensor 122 to vary as a function of the root depth 218. Due to the fact that the pin 124 and/or the spring 126 are made of metal, this variation causes a corresponding variation in the inductance sensed by the inductive sensor 122. As a result, the output of the first sensor 122 corresponds to the root depth 218 of the key 200 at the point contacted by the pin 124. The first sensor 122 may therefore alternatively be referred to herein as the root depth sensor 122.

In embodiments that include the insulating sleeve 128, the sleeve 128 is formed of a non-conductive material and isolates the pin 124 and the spring 126 from the housing 110. This may increase the fidelity with which the output of the sensor 122 corresponds to the root depth 218, particularly in embodiments in which the housing 110 is formed of a conductive material. It is also contemplated that the sleeve 128 may be omitted, for example in embodiments in which the housing 110 itself is formed of a nonconductive material.

During insertion of the key 200, the insertion depth 102 increases, thereby decreasing the distance between the tip 219 and the second inductive sensor 122. Due to the fact that the key 200 is made of metal, this variation causes a corresponding variation in the inductance sensed by the inductive sensor 132. As a result, the output of the second sensor 132 corresponds to the insertion depth 102. The second sensor 132 may therefore alternatively be referred to herein as the insertion depth sensor 132.

Figures 3, 4A, 4B:
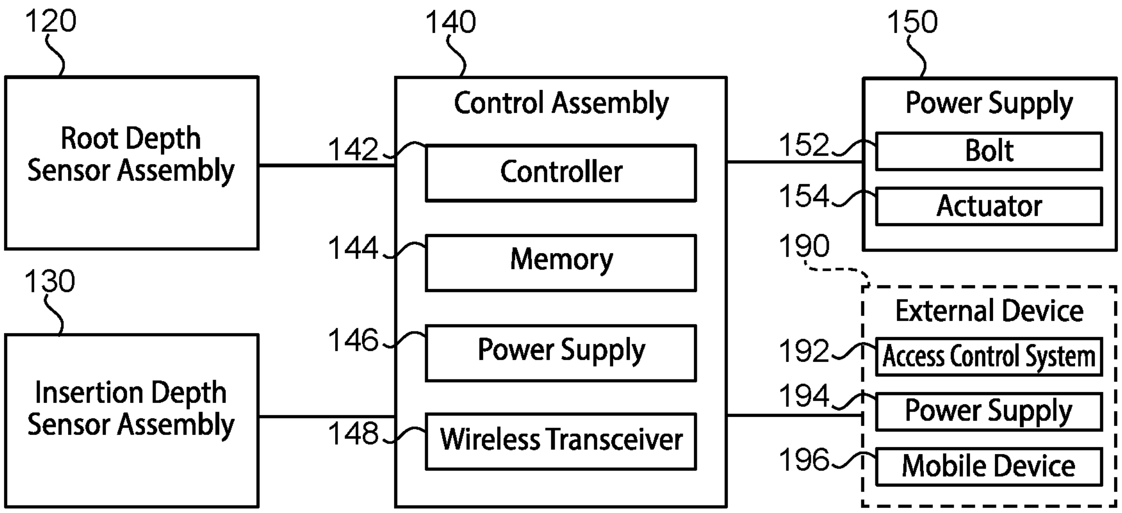
FIG. 3 is a schematic block diagram of the access control device.
FIGS. 4A and 4B are examples of tables that may be utilized as lookup tables in certain embodiments.

With additional reference to FIG. 3, the control assembly 140 includes a controller 142 and memory 144, and may further include an onboard power supply 146 and/or a wireless transceiver 148. The control assembly 140 is in communication with each of the sensor assemblies 120, 130 and the locking device 150, and may further be in communication with an external device 190, such as an access control system 192, an external power supply 194, and/or a mobile device 196. As described herein, the controller 142 may be in selective communication with the access control system 192 and/or the mobile device 196 via the wireless transceiver 148, which may, for example, be provided as a Bluetooth transceiver.

The electronic lock 150 has a locked state and an unlocked state, and is configured to transition between the locked and unlocked states in response to commands received from the control assembly 150 without requiring rotation of the key 200. The locking device 150 may, for example, include a bolt 152 having an extended locking position and a retracted unlocking position. In certain forms, the locking device 150 may cause the bolt 152 to move between the extended and retracted positions to transition between the locked state and the unlocked state. In certain forms, the locking device 150 may include a manual actuator 154 such as a handle that is selectively operable to retract the bolt 152 when the locking device 150 is in the unlocked state. In certain embodiments, the locking device 150 may control electronic access to digital information.

The control assembly 140 is in communication with each of the sensor assemblies 120, 130 such that the controller 142 is operable to receive the outputs of each of the sensors 122, 132. The control assembly 140 has stored in memory 144 information relating the output of the root depth sensor 122 to the digit corresponding to the root depth 218 sensed by the sensor 122. The control assembly 140 also has stored in memory 144 information relating the output of the insertion depth sensor 132 to the bitting position corresponding to the insertion depth 102 sensed by the sensor 132.

With additional reference to FIGS. 4A and 4B, the information related to the outputs of the sensors may, for example, be stored in lookup tables 144A, 144B. For example, a root depth lookup table 144A may indicate, among other information, that an output of 7.6 from the root depth sensor 122 is present when the follower pin 124 is engaged with a bitting 220 having a root depth that corresponds to a size code of “2”. Similarly, an insertion depth lookup table 144B may indicate, among other information, that an output of 0.25 from the insertion depth sensor 132 is present when the key 200 has been inserted to an insertion depth 102 at which the follower pin 124 is engaged with the sixth bitting 226. Thus, the root depth sensor 122 providing an output of 7.6 while the insertion depth sensor 132 provides an output of 0.25 indicates to the controller 142 that the sixth digit 236 of the bitting code 230 is “2”.

Figure 5:
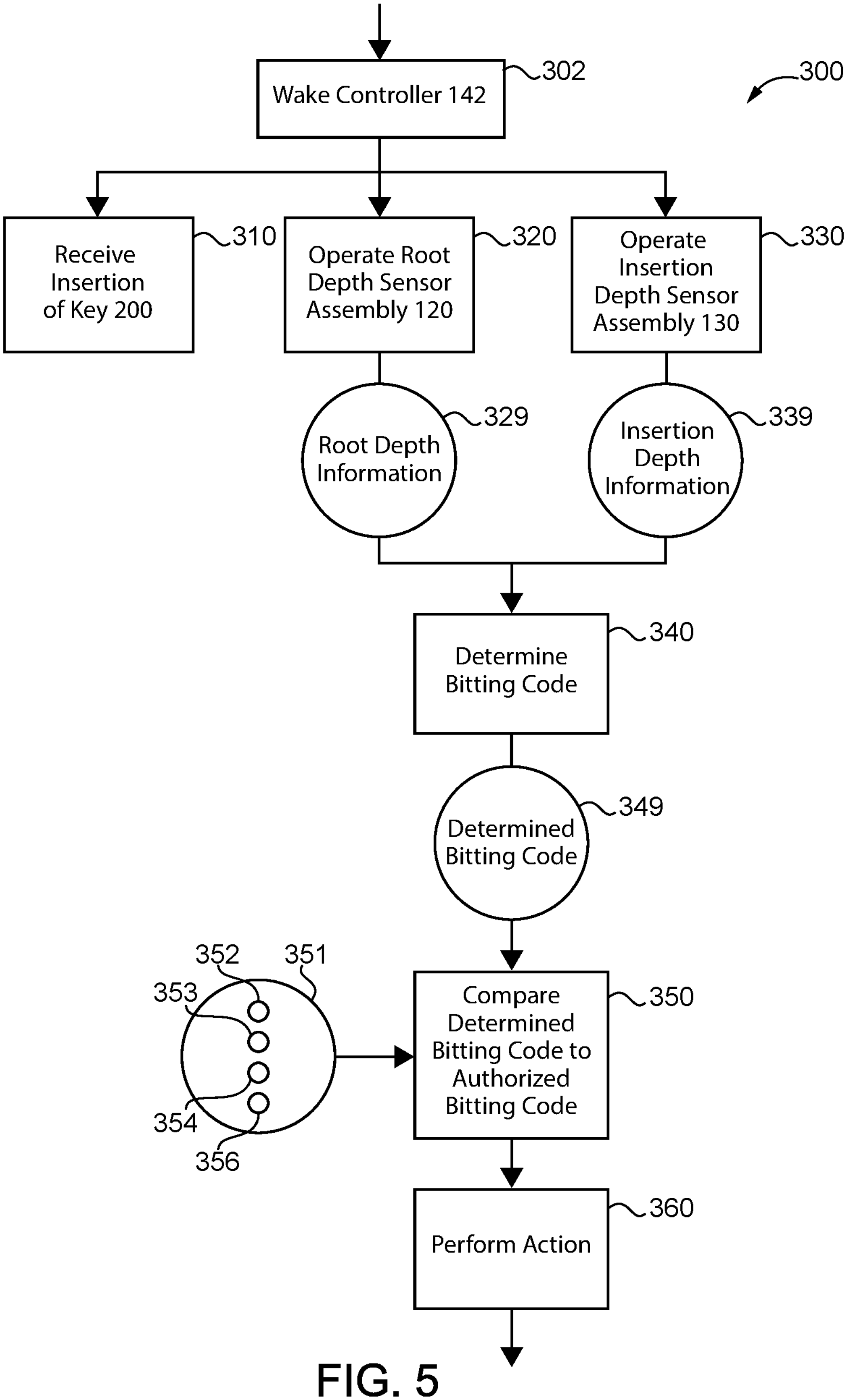
FIG. 5 is a schematic block diagram of a process according to certain embodiments.

With additional reference to FIG. 5, an exemplary process 300 that may be performed using the access control device 100 is illustrated. Operations illustrated for the processes in the present application are understood to be examples only, and operations may be combined or divided, and added or removed, as well as re-ordered in whole or in part, unless explicitly stated to the contrary. Unless specified to the contrary, it is contemplated that certain operations or blocks performed in the process 300 may be performed wholly by the root depth sensor assembly 120, the insertion depth sensor assembly 130, the control assembly 140, and/or the electronic lock 150, or that the operations or blocks may be distributed among one or more of the elements and/or additional devices or systems that are not specifically illustrated in FIGS. 1-4.

In certain forms, the process 300 may begin with the controller 142 operating in a low-power sleep mode. In such forms, the process 300 may begin with block 302, which generally involves waking the controller 142 from the low-power sleep mode to operate the controller 142 in a normal-power active mode. The process 300 includes block 310, which generally involves receiving insertion of the key 200 in the keyway 111. In certain forms, the waking may be triggered by initial movement of the follower pin 124, while in other forms, the waking may be triggered by a separate switch, for example one that senses initial insertion of the key 200 into the keyway 111. Thus, while the blocks 302, 310 are illustrated in a generally serial fashion, it is to be appreciated that receiving insertion of the key 200 in block 310 may trigger the waking of block 302.

With the controller 142 operating in the normal-power active mode, the control assembly 140 directs power to the sensor assemblies 120, 130 and begins operation of blocks 320 and 330. Block 320 involves operating the root depth sensor assembly 120 to monitor the root depth 218 during insertion of the key 200 in block 310, thereby generating root depth information 329. Similarly, block 330 involves operating the insertion depth sensor assembly 130 to monitor the insertion depth 102 during insertion of the key 200 in block 310, thereby generating insertion depth information 339.

With additional reference to FIG. 6, illustrated therein is an example table that may be generated during the process 300. The table includes the root depth information 329 and the insertion depth information 339, and may be utilized by the controller 142 during block 340, which generally involves determining the bitting code 230 of the key 200 based upon the root depth information 329 and the insertion depth information 339. The controller 142 may identify those entries in which the insertion depth information 329 indicates that the entry corresponds to a point in time at which the follower pin 124 is engaged with one of the bittings 220. For example, each of the circled entries in the left column (i.e., the insertion depth information 339) corresponds to a respective one of the entries in the insertion depth lookup table 144B within a predetermined margin of error. As such, the controller 142 analyzes the corresponding entries in the right column (i.e., the root depth information 329) by comparing these entries to the root depth lookup table 144A to determine the size code for each of the bittings 220. As illustrated, the information 149 indicates that the bitting code 230 for the key 200 is “253842,” which matches the above-mentioned bitting code 230 for the key 200. Accordingly, block 340 involves generating the bitting code “253842” as a determined bitting code 349.

Upon generating the determined bitting code 349, the process 300 continues to block 350, which generally involves comparing the determined bitting code 349 to an authorized bitting code list 351 including one or more authorized bitting codes, and determining an action to perform based upon the comparing. The process 300 also includes block 360, which involves performing the determined action.

In certain forms, the authorized bitting code list 351 may include a lock/unlock bitting code 352, and block 340 may involve determining to perform a lock/unlock operation in response to the determined bitting code 349 matching the lock/unlock bitting code 352. In such forms, block 360 may involve issuing a lock/unlock command to the electronic lock 150 to thereby cause the lock device 150 to transition between a locked state and an unlocked state. As will be appreciated, the locking and unlocking of the lock device 150 may be performed without requiring rotation of the key 200, particularly in those embodiments in which the keyway 111 is not rotatable relative to the housing 110.

In certain forms, the authorized bitting code list 351 may include an inhibit bitting code 353, and block 350 may involve determining to perform an inhibit operation in response to the determined bitting code 349 matching the inhibit bitting code 353. In such forms, block 360 may involve removing an existing bitting code from the authorized bitting code list 351. For example, block 360 may involve repeating blocks 310-340 to determine the bitting code of a newly-inserted key, and removing the bitting code of the newly-inserted key from the authorized bitting code list 351.

In certain forms, the authorized bitting code list 351 may include a rekey bitting code 354, and block 350 may involve determining to perform a rekey operation in response to the determined bitting code 349 matching the rekey bitting code 354. In such forms, block 360 may involve adding a new bitting code to the authorized bitting code list 351. For example, block 360 may involve repeating blocks 310-340 to determine the bitting code of a newly-inserted key, and adding the bitting code of the newly-inserted key to the authorized bitting code list 351, for example as a new lock/unlock bitting code 352. In such forms, block 360 may or may not include removing the previous lock/unlock bitting code 352 from the list 351.

In certain forms, the authorized bitting code list 351 may include a reprogram bitting code 356, and block 350 may involve determining to perform a reprogramming operation in response to the determined bitting code 349 matching the reprogram bitting code 356. In such forms, block 360 may involve activating the wireless transceiver 148 to initiate wireless communication with the mobile device 196. The mobile device 196 may include an application configured to interface with the control assembly 140 to cause the control assembly 140 to perform one or more actions. In certain forms, the mobile device 196 may be utilized to add and remove codes from the authorized bitting code list 351. For example, the mobile device 196 may be utilized to update the list 351 with additional or alternative bitting codes that are authorized as a lock/unlock bitting code 352, an inhibit bitting code 353, a rekey bitting code 354, and/or a reprogram bitting code 356.

In certain forms, block 360 may include performing an additional action in addition to the determined action. For example, block 360 may include developing an audit trail identifying the date and time at which the determined bitting code 349 was determined. The audit trail may be accessible via the access control system 192 and/or the mobile device 196 to allow facility management to determine how and by whom the access control device 100 has been used.

Upon completion of the action in block 360, the process 300 may terminate. In certain forms, the process 300 may involve returning the controller 140 to the low-power sleep mode upon completion of block 360.

One issue that has hindered the adoption of electronic locks in certain existing access control systems is the start-up cost associated with converting an existing access control system using mechanical keys to a credential-based system. For example, while a system that utilizes mechanical keys requires only a relatively simple key grinder to generate new keys, conversion to a credential-based system requires that the facility manager acquire a credential writer and associated software to issue new credentials. In contrast, the access control device 100 described herein is capable of use with existing keys, thereby facilitating the conversion to a partially-electronic access control system.

An issue particular to electronic lock cylinders involves the difficulty in electronically acquiring the information required to determine the bitting code of the key. In particular, many traditional electronic lock cylinders utilize the standard lock cylinder format, in which a plug defining the keyway is rotatably mounted in a shell. Due to the fact that the cut of the key must be determined within the rotatable plug (i.e., where the key is inserted), there is difficulty in transmitting this information to the shell in which the control assembly and/or the actuator is seated. Alternatively, in those devices in which the control assembly and/or the actuator is seated in the plug, there is difficulty in transmitting power into the rotatable plug. These difficulties mandate more complex wiring solutions that are obviated by the access control device 100. For example, due to the fact that the access control device 100 obviates the need for turning the key 200, simpler wiring solutions can be utilized.

Another issue that arises with traditional lock cylinders is the difficulty of rekeying the lock cylinder for new keys. While rekeying is possible, it can represent a significant cost and typically requires a locksmith, rekeying tools, and spare key pins for the particular cylinder type. The access control device 100, by contrast, can allow for instantaneous rekeying without changing any mechanical components within the device 100.

A further issue with traditional key systems is that they are limited to a small number of keys. Building key systems can be set up to support sub-groups through how master keys are configured within the keyway, and by creation of multiple shear lines. For example, grand-master keys may open all locks, master keys may open smaller domains, sub-master keys are associated with even smaller domains, and in the most complex systems, differ keys can be used on individual doors only. These are powerful entry management solutions, but require complex configurations of multiple pins within the locks of the building. The access control device 100, by contrast, can provide the benefit of individually assigning access to doors based on any key combination to support master keying without adding mechanical complexity.

In the illustrated form, each bitting 220 has one of ten possible root depths 218, and the access control device 100 is configured to distinguish between the ten possible root depths to determine the bitting code 230 of the key 200. It is also contemplated that more than ten root depths may be available for each of the bittings 220, and that the access control device 100 may be configured to distinguish between the more than ten possible root depths to determine the bitting code 230 of the key.

As noted above, the construction of the access control device 100 may be simpler than traditional lock cylinders, both of the mechanical and electronic varieties. The housing 110 need only support the insertion of the key 200 and the interface of the follower pin 124 against the edge cut 216, and need not accommodate rotation of a plug or provide for a mechanical shear line. As such, a single SKU of the access control device 100 from the manufacturing line can support all uses of the product in the field. This is in contrast to the complexity of managing and producing key systems for mechanical rotary key solutions. The key system can continue to support different cross-sectional profiles of the shank 210 to limit which keys can be inserted into the keyway 111. Additionally, the same materials can be used for the access control device 100 as used in conventional lock cylinders to provide the same mechanical robustness of the key through prolonged use. Furthermore, due to the elimination of the requirement for a mechanical shear line, the access control device 100 cannot be picked by those traditional methods utilized to pick traditional lock cylinders.

Furthermore, the access control device 100 can be provided for the purpose of simply reading the bitting code 230 of the key 200 such that the actual locking and unlocking of the locking device 150 is decoupled from the key solution. This provides a modular approach that facilitates the use of the same access control device 100 in combination with many different types of lock devices 150.

Figure 7:
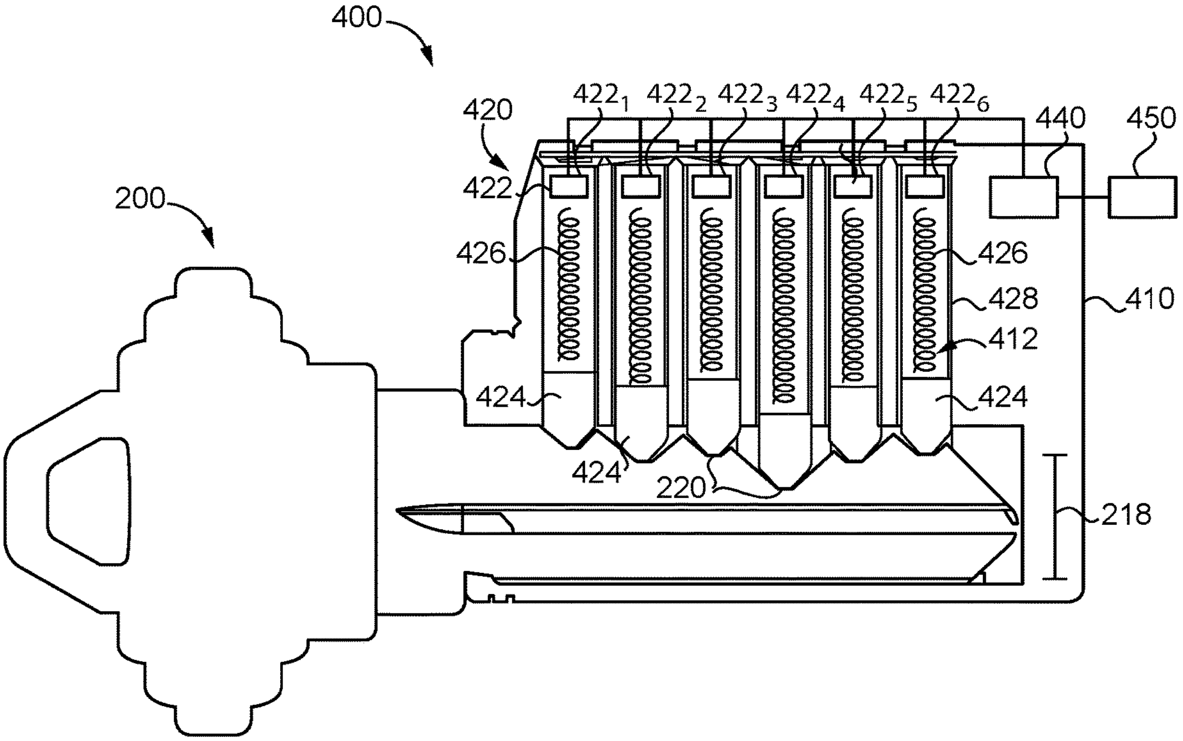
FIG. 7 is a cross-sectional illustration of an access control device according to certain embodiments, along with a key.

With additional reference to FIG. 7, illustrated therein is an access control device 400 according to certain embodiments, which is also configured for use with keys such as the key 200. The access control device 400 is substantially similar to the above-described access control device 100, and similar reference characters are used to indicate similar elements and features. For example, the access control device 400 includes a housing 410, a root depth sensor assembly 420, a control assembly 440, and an electronic lock 450, which respectively correspond to the housing 110, the root depth sensor assembly 120, the control assembly 140, and the electronic lock 150. In the interest of conciseness, the following description of the access control device 400 focuses primarily on elements and features that are different from those described above with reference to the access control device 100. However, it is to be appreciated that the access control device 400 may nonetheless include features such as those described above with reference to the access control device 100.

In the illustrated form, the housing 410 includes six shafts 412 corresponding to the six bittings 220, and the sensor assembly 420 includes a plurality of the above-described root depth sensor assemblies 120, each of which corresponds to a respective bitting position 220 and includes an inductive sensor 422, a follower pin 424, a spring 426, and an insulating sleeve 428. Thus, the sensor assembly 420 includes first through sixth inductive sensors 4221-4226 that respectively correspond to the first through sixth bittings 221-226.

When the key 200 is fully inserted, each follower pin 424 is seated on the corresponding one of the bittings 220 such that the output of the sensor 422 corresponds to the root depth 218 of the key 200 at the bitting 220 with which the follower pin 424 is engaged. The output of the sensor assembly 420 therefore corresponds to the bitting code 230 of the key 200 when the key 200 is fully inserted, thereby obviating the need to sense the insertion depth. As such, the access control device 400 need not include an insertion depth sensor assembly such as the above-described sensor assembly 130.

Those skilled in the art will readily appreciate that the access control device 400 can be utilized in a process similar to the above-described process 300, and presents advantages similar to those described above with reference to the access control device 100.

Figure 8:
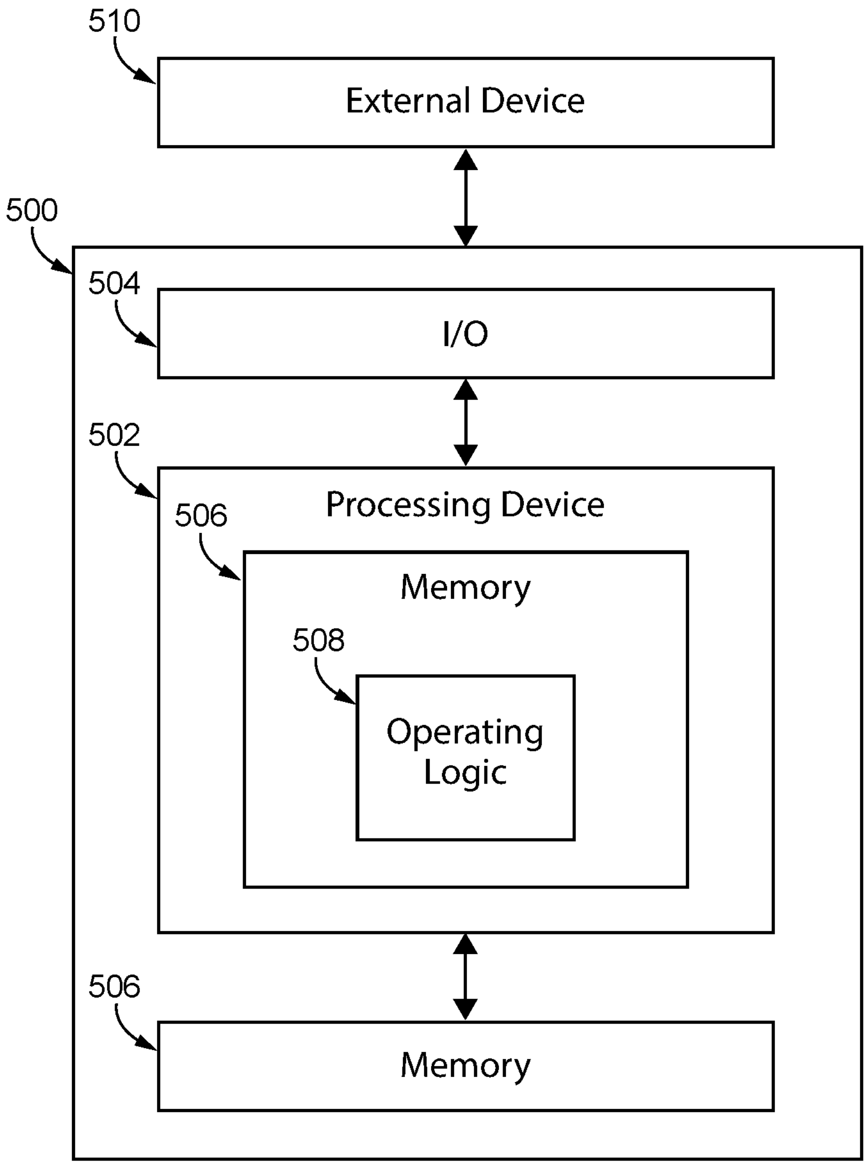
FIG. 8 is a schematic block diagram of a computing device.

Referring now to FIG. 8, a simplified block diagram of at least one embodiment of a computing device 500 is shown. The illustrative computing device 500 depicts at least one embodiment of a control assembly, electronic lock, access control system, or mobile device that may be utilized in connection with the control assembly 140, 440, electronic lock 150, 450 access control system 192, or mobile device 196 shown in the Figures.

Depending on the particular embodiment, computing device 500 may be embodied as a server, desktop computer, laptop computer, tablet computer, notebook, netbook, Ultrabook™, mobile computing device, cellular phone, smartphone, wearable computing device, personal digital assistant, Internet of Things (IOT) device, reader device, access control device, control panel, processing system, router, gateway, and/or any other computing, processing, and/or communication device capable of performing the functions described herein.

The computing device 500 includes a processing device 502 that executes algorithms and/or processes data in accordance with operating logic 508, an input/output device 504 that enables communication between the computing device 500 and one or more external devices 510, and memory 506 which stores, for example, data received from the external device 510 via the input/output device 504.

The input/output device 504 allows the computing device 500 to communicate with the external device 510. For example, the input/output device 504 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 500. The input/output device 504 may include hardware, software, and/or firmware suitable for performing the techniques described herein.

The external device 510 may be any type of device that allows data to be inputted or outputted from the computing device 500. For example, in various embodiments, the external device 510 may be embodied as the access control device 100, the first sensor assembly 120, the second sensor assembly 130, the control assembly 140, or the electronic lock device 150. Further, in some embodiments, the external device 510 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 510 may be integrated into the computing device 500.

The processing device 502 may be embodied as any type of processor(s) capable of performing the functions described herein. In particular, the processing device 502 may be embodied as one or more single or multi-core processors, microcontrollers, or other processor or processing/controlling circuits. For example, in some embodiments, the processing device 502 may include or be embodied as an arithmetic logic unit (ALU), central processing unit (CPU), digital signal processor (DSP), and/or another suitable processor(s). The processing device 502 may be a programmable type, a dedicated hardwired state machine, or a combination thereof. Processing devices 502 with multiple processing units may utilize distributed, pipelined, and/or parallel processing in various embodiments. Further, the processing device 502 may be dedicated to performance of just the operations described herein, or may be utilized in one or more additional applications. In the illustrative embodiment, the processing device 502 is of a programmable variety that executes algorithms and/or processes data in accordance with operating logic 508 as defined by programming instructions (such as software or firmware) stored in memory 506. Additionally or alternatively, the operating logic 508 for processing device 502 may be at least partially defined by hardwired logic or other hardware. Further, the processing device 502 may include one or more components of any type suitable to process the signals received from input/output device 504 or from other components or devices and to provide desired output signals. Such components may include digital circuitry, analog circuitry, or a combination thereof.

The memory 506 may be of one or more types of non-transitory computer-readable media, such as a solid-state memory, electromagnetic memory, optical memory, or a combination thereof. Furthermore, the memory 506 may be volatile and/or nonvolatile and, in some embodiments, some or all of the memory 506 may be of a portable variety, such as a disk, tape, memory stick, cartridge, and/or other suitable portable memory. In operation, the memory 506 may store various data and software used during operation of the computing device 500 such as operating systems, applications, programs, libraries, and drivers. It should be appreciated that the memory 506 may store data that is manipulated by the operating logic 508 of processing device 502, such as, for example, data representative of signals received from and/or sent to the input/output device 504 in addition to or in lieu of storing programming instructions defining operating logic 508. As illustrated, the memory 506 may be included with the processing device 502 and/or coupled to the processing device 502 depending on the particular embodiment. For example, in some embodiments, the processing device 502, the memory 506, and/or other components of the computing device 500 may form a portion of a system-on-a-chip (SoC) and be incorporated on a single integrated circuit chip.

In some embodiments, various components of the computing device 500 (e.g., the processing device 502 and the memory 506) may be communicatively coupled via an input/output subsystem, which may be embodied as circuitry and/or components to facilitate input/output operations with the processing device 502, the memory 506, and other components of the computing device 500. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 500 may include other or additional components, such as those commonly found in a typical computing device (e.g., various input/output devices and/or other components), in other embodiments. It should be further appreciated that one or more of the components of the computing device 500 described herein may be distributed across multiple computing devices. In other words, the techniques described herein may be employed by a computing system that includes one or more computing devices. Additionally, although only a single processing device 502, I/O device 504, and memory 506 are illustratively shown in FIG. 5, it should be appreciated that a particular computing device 500 may include multiple processing devices 502, I/O devices 504, and/or memories 506 in other embodiments. Further, in some embodiments, more than one external device 510 may be in communication with the computing device 500.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An electronic lock cylinder, comprising:
a keyway configured to receive a mechanical key;
a plurality of sensors configured to sense a root depth at each of a plurality of bittings of the mechanical key during insertion of the mechanical key into the keyway, wherein the plurality of sensors are configured to generate root depth information relating to the sensed root depth; and
a controller configured to i) determine a bitting code of the mechanical key based on the root depth information, ii) compare the bitting code of the mechanical key to an authorized bitting code; and iii) transmit an access control command in response to the bitting code matching the authorizing bitting code; and
wherein the electronic lock cylinder is configured to transition from a locked state to an unlocked state in response to the access control command without requiring rotation of the mechanical key.

2. The electronic lock cylinder of claim 1, wherein the plurality of sensors comprise a plurality of root depth sensors.

3. An electronic lock cylinder, comprising:
a keyway configured to receive a mechanical key;
a plurality of root depth sensors configured to sense a root depth at each of a plurality of bittings of the mechanical key during insertion of the mechanical key into the keyway, wherein the plurality of sensors are each configured to generate root depth information relating to the sensed root depth, and wherein the plurality of root depth sensors each comprise an inductive sensor configured to generate the root depth information based on an inductance sensed by the inductive sensor; and
a controller configured to i) determine a bitting code of the mechanical key based on the root depth information, ii) compare the bitting code of the mechanical key to an authorized bitting code; and iii) transmit an access control command in response to the bitting code matching the authorizing bitting code.

4. The electronic lock cylinder of claim 3, wherein each of the plurality of root depth sensors comprises a follower pin configured to ride along a cut edge of the mechanical key during insertion of the mechanical key into the keyway, and a spring biasing the follower pin into the keyway.

5. The electronic lock cylinder of claim 4, further comprising an insulating sleeve in which the spring and the follower pin are mounted.

6. The electronic lock cylinder of claim 4, wherein the follower pin is constructed of metal and is configured to vary the inductance sensed by the inductive sensor as a function of the root depth.

7. The electronic lock cylinder of claim 1, further comprising at least one insertion depth sensor configured to sense insertion depth of the mechanical key in the keyway.

8. The electronic lock cylinder of claim 7, wherein the at least one insertion depth sensor is configured to generate insertion depth information relating to the sensed insertion depth; and wherein the bitting code of the mechanical key is generated based on the root depth information and the insertion depth information.

9. The electronic lock cylinder of claim 7, wherein the at least one insertion depth sensor comprises an inductive sensor configured to generate insertion depth information based on an inductance sensed by the inductive sensor.

10. The electronic lock cylinder of claim 9, wherein the mechanical key is constructed of metal and is configured to vary the inductance sensed by the inductive sensor as a function of the insertion depth of the mechanical key in the keyway.

11. The electronic lock cylinder of claim 1, wherein the authorized bitting code is a lock/unlock bitting code; and wherein the access control command comprises a lock/unlock command.

12. The electronic lock cylinder of claim 1, wherein the controller is configured to remove the authorized bitting code from memory in response to the bitting code of the mechanical key matching an inhibit bitting code.

13. The electronic lock cylinder of claim 1, wherein the authorized bitting code is a rekey bitting code.

14. The electronic lock cylinder of claim 13, wherein the controller is configured to add a lock/unlock bitting code to memory in response to the bitting code of the mechanical key matching the rekey bitting code.

15. The electronic lock cylinder of claim 1, further comprising a housing defining the keyway, and wherein the keyway is not capable of rotating within the housing.

16. The electronic lock cylinder of claim 1, wherein the keyway has a permanently fixed position in the electronic lock cylinder.

17. An electronic lock cylinder, comprising:

a keyway configured to receive a mechanical key, wherein the keyway has a permanently fixed position in the electronic lock cylinder;

a plurality of sensors configured to sense a root depth at each of a plurality of bittings of the mechanical key during insertion of the mechanical key into the keyway, wherein the plurality of sensors are configured to generate root depth information relating to the sensed root depth; and a controller configured to i) determine a bitting code of the mechanical key based on the root depth information, ii) compare the bitting code of the mechanical key to an authorized bitting code; and iii) transmit an access control command in response to the bitting code matching the authorizing bitting code.

18. A system, comprising:

the electronic lock cylinder of claim 17; and an electronic lock device in communication with the controller, wherein the electronic lock device is configured to transition between a locked state and an unlocked state in response to receiving the access control command.

19. The system of claim 18, wherein the electronic lock device comprises a handle and a bolt having an extended position and a retracted position;

wherein with the electronic lock device in the locked state, the handle is inoperable to move the bolt from the extended position to the retracted position; and wherein with the electronic lock device in the unlocked state, the handle is operable to move the bolt from the extended position to the retracted position.

20. The system of claim 18, wherein the electronic lock device is configured to transition between a locked state and an unlocked state without requiring rotation of the mechanical key.

21. A system, comprising:

the electronic lock cylinder of claim 17; and the mechanical key.

22. The electronic lock cylinder of claim 17, further comprising an electronic lock device in communication with the controller;

wherein the authorized bitting code is a lock/unlock bitting code;

wherein the controller is configured to transmit a lock/unlock command to the electronic lock device in response to the bitting code of the mechanical key matching the lock/unlock bitting code; and wherein the electronic lock device is configured to transition between a locked state and an unlocked state in response to receiving the lock/unlock command.

23. An electronic lock cylinder, comprising:

a housing defining a keyway configured to receive a mechanical key, and wherein the keyway is not capable of rotating within the housing;

a plurality of sensors configured to sense a root depth at each of a plurality of bittings of the mechanical key during insertion of the mechanical key into the keyway, wherein the plurality of sensors are configured to generate root depth information relating to the sensed root depth; and a controller configured to i) determine a bitting code of the mechanical key based on the root depth information, ii) compare the bitting code of the mechanical key to an authorized bitting code; and iii) transmit an access control command in response to the bitting code matching the authorizing bitting code.

24. The electronic lock cylinder of claim 23, wherein the keyway has a fixed position within the housing.

* * * * *